Dec. 25, 1951     W. J. MORRILL     2,580,313
MOTOR MOUNTING

Filed June 12, 1946     3 Sheets-Sheet 1

INVENTOR.
Wayne J. Morrill
BY
Woodling and Krost
attys.

Dec. 25, 1951 W. J. MORRILL 2,580,313
MOTOR MOUNTING
Filed June 12, 1946 3 Sheets-Sheet 2

INVENTOR.
Wayne J. Morrill
BY
Stradling and Krost
attys.

Patented Dec. 25, 1951

2,580,313

UNITED STATES PATENT OFFICE 2,580,313

MOTOR MOUNTING

Wayne J. Morrill, Fort Wayne, Ind.

Application June 12, 1946, Serial No. 676,308

7 Claims. (Cl. 248—26)

My invention relates in general to motor mountings and in particular to an improved motor mounting to be attached to the end bell of an electric motor for supporting the motor.

In many instances it is desirable to isolate vibration of one part of an apparatus from the remainder of the apparatus. Therefore, an object of my invention is the provision of an elastic mounting which operates to allow a vibrating part to vibrate freely without transmitting the vibrating through the mounting to the supporting apparatus.

An object of my invention is the provision of a motor mounting to reduce and isolate noise caused by vibration of the motor.

Another object of my invention is the provision of a motor mounting for an electric motor which is resiliently fastened to the center of one end bell and at annularly spaced points about that end bell of the motor for supporting the motor.

Another object of my invention is the provision of a motor mounting for an electric motor which is resiliently fastened at annularly spaced points about one end bell of the motor for supporting the motor.

Another object of my invention is the provision of a motor mounting which engages one end of the motor to support the motor and which has resilient means for isolating vibrations of the motor.

Another object of my invention is the provision of a motor mounting including a resilient material which operates in shear to reduce transmission of torsional vibrations of the motor to a support or other apparatus.

Figure 1:
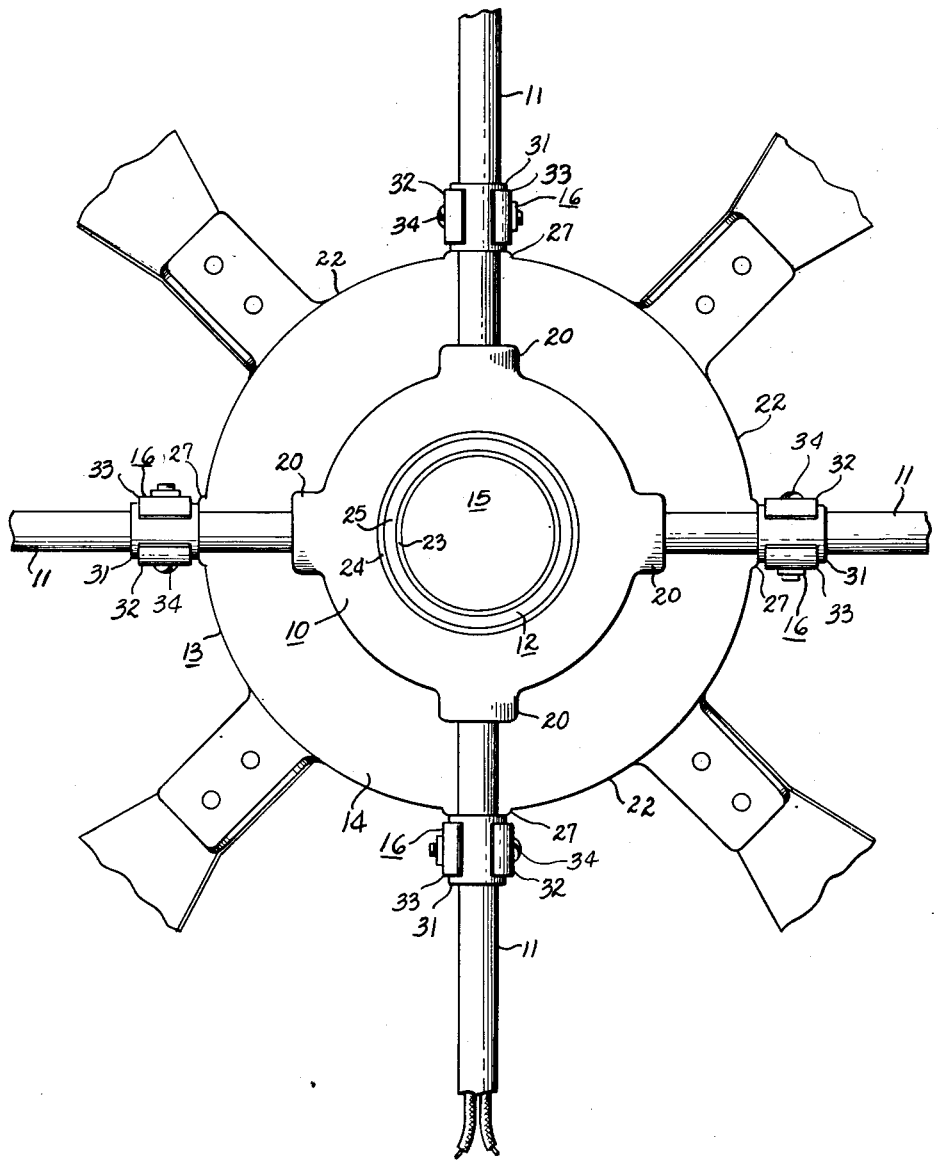
Figure 2:
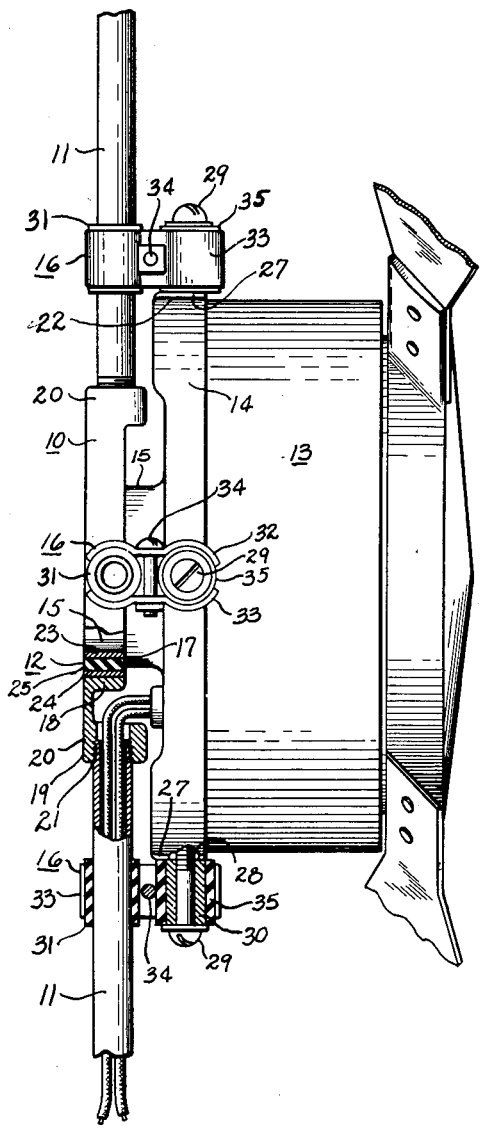
Figure 3:
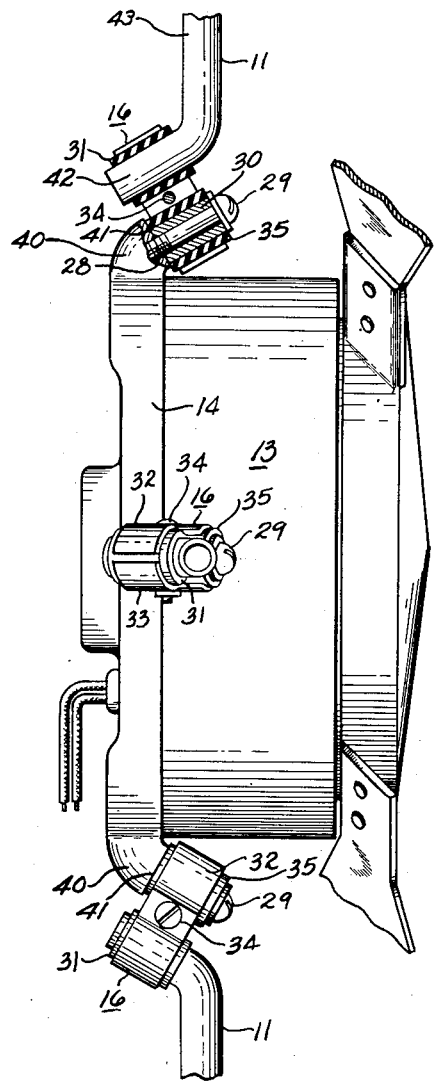

Other objects and a fuller understanding of my invention may be had by referring to the following description and claims, taken in conjunction with the accompanying drawing, in which:

Figure 1 of my drawings is an end rear view of an electric motor illustrating my improved motor mounting; and Figure 2 is a side elevational view, certain parts being shown in cross-section;

Figure 3 is a side elevational view of a modification of my improved motor mounting, certain parts being shown in cross-section.

One of the major problems in the construction of electric fans is the elimination of excessive noise. This excessive noise is usually caused by torsional vibration of the motor. The principal mode of vibration is rotary about the axis of the motor. Conventionally a motor is mounted in two elastic or concentric rubber rings, one on each end of the motor, to prevent excessive rotary or torsional vibration being transmitted to the motor support or other apparatus. However, this conventional mounting cannot be practically used on electric fans in which the fan blades are fastened to a cover member which covers one end of the motor. My motor mounting is fastened to only one end of the motor and has resilient or elastic means which isolate the torsional vibration of the motor to eliminate excessive noise. The elastic or resilient means incorporated in my improved motor mounting allow the motor to vibrate freely without transmitting the vibrations through the mounting to the motor support. Although my descriptions and drawings particularly describe my preferred motor mounting, it is understood that modifications and changes may be incorporated in the motor mounting without departing from the scope of my invention.

My preferred motor mounting as illustrated in Figures 1 and 2 comprises a supporting spider having a spider center portion 10 having arms 11 spaced annularly thereabout and extending outwardly therefrom. These arms 11 may be fastened at their outer extremities to a support or other apparatus, such for example conduit or tubing, to support the motor and motor mounting spider. The electric motor 13 which is fastened to the spider 10 has an end bell 14 with a hub 15 extending outwardly therefrom. The spider center portion 10 has an opening in the center thereof through which the hub 15 of the motor extends. A resilient ring 12 is compressed between the spider center portion 10 and the hub 15 of the end bell 14 of the motor. Connecting links 16 resiliently connect the arms 11, extending from the spider 10, to the end bell 14 at annularly spaced intervals.

The spider center portion 10 may be constructed of any suitable material such, for example, as castings or stampings, and has an inner wall portion 18 and an outer wall portion 19. The inner wall portion 18, which defines the opening in the center of the spider, has a flat surface for engaging the outer surface of the resilient ring 12. The outer wall portion 19 has raised bosses 20 with threaded openings 21 therein. These bosses are located at annularly spaced intervals about the outer wall portion 19 and provide a means of fastening the arms 11 to the spider center portion 10.

In my preferred motor mounting, as is illustrated in Figures 1 and 2, I have used tubular shaped arms 11 which may be threaded into the openings 21 in the bosses 20 on the outer wall portion 19 of the spider center portion 10. These tubular arms 11 extend outwardly from the spider and are of sufficient length to extend beyond the edge 22 of the end bell 14. The outer extremities of the tubular shaped arms 11 may be fastened to a suitable support means, not shown in my drawing, for supporting the motor and fan. The hub 15 has a shoulder 17 thereabout and against which the resilient ring 12 abuts when the ring is pressed over the hub. This shoulder 17 aligns the ring with the inner wall portion 18 of the spider center portion 10. The resilient ring 12, which is placed between the inner wall portion 18 of the spider and the hub 15 of the end bell 14, is preferably constructed from a pair of metal bands 23 and 24 with a resilient material 25 therebetween. The inner metal band 23 is of a diameter substantially equal to the diameter of the hub 15 and engages the hub 15 substantially with a press-fit. The outer band 24 has a diameter substantially equal to the diameter of the opening in the spider 10 and engages the inner wall portion 18 with substantially a press-fit. The resilient material 25, separating these metal bands 23 and 24, may be composed of a rubber compound or other suitable resilient material which will operate in shear to isolate the torsional motor vibrations.

The end bell 14 has bosses 27 with threaded openings 28 therein. These bosses 27 are on the edge 22 of the end bell 14 and are annularly spaced for alignment with the arms 11 extending from the spider center portion 10. A screw 29 with a bushing 30 thereabout is threaded into the opening 28.

For connecting links 16, which connect the end bell 14 to the extended arms 11 of my motor mounting, I have found the clamps, which will simultaneously tighten on to the arm 11 and this bushing 30, to be very useful. As illustrated in my drawings, these clamps may comprise two members 32 and 33 connected in the center thereof by a suitable screw 34. When the screw 34 is tightened, these two clamp members 32 and 33 are pulled together and extend partly about the arm on one end thereof and about this bushing 30 on the other end thereof.

A tubular sleeve 35 of resilient material is placed between the bushing 30 and the clamp members 32 and 33. Similarly, a tubular sleeve 31 of resilient material is placed between the arm 11 and the clamp members 32 and 33. These tubular sleeves 31 and 35 provide resilient or elastic means for supporting the motor and at the same time isolate vibration and noise caused by the torsional movement of the motor.

The overhung weight of the motor tends to put these tubular sleeves in compression. The weight of the motor causes the upper connecting link 16 to be in tension and the bottom connecting link 16 to be in compression. The clamp members in either, however, are urged toward the respective arm and thus compress the tubular sleeves therebetween. The combination of these connecting links 16 and the tubular sleeves provide a rigid support for the motor. When the spider is in a vertical plane the axis of the motor is kept substantially horizontal.

With my preferred motor mounting, as illustrated in Figures 1 and 2, the motor is fastened to the mounting on only one end of the motor. The end bell is resiliently fastened at the center thereof and at annularly spaced intervals thereabout to the supporting spider. Since the principal mode of vibration is rotary about the axis of the motor, the resilient material in the resilient ring is in shear, which is the best way to use resilient material for sound isolation purposes. When the motor tends to rotate and thereby twist the connecting links, the tubular sleeves of resilient material is in shear.

In Figure 3 of my drawings, I have illustrated a modification of my improved motor mounting which engages one end bell of the motor to support the motor and which has resilient or elastic means to allow the motor to vibrate freely without transmitting the vibration through the mounting to the motor support. As is illustrated in Figure 3, the support arms 11 of the motor mounting are resiliently fastened at annularly spaced intervals about the perimetrical edge of one end bell of the motor. In this modification, the end bell 14 has bosses 40 integral therewith and at spaced intervals about the perimetrical edge 22 of the end bell 14. The bosses 40 have a surface 41 with a threaded opening 28 extending therein. The surface 41 is in a plane disposed at an angle to the axis of the motor 13. As in my preferred motor mounting, a screw 29 with a bushing 30 thereabout is threaded into the opening 28 extending into the boss 40 from the surface 41 thereof. The screw 29 is disposed in a plane substantially perpendicular to the surface 41 of the boss 40.

Each supporting arm 11 has a bend whereby a terminal portion of the arm 11 may be disposed parallel to the screw 29 and an outer or extending portion 43 of the arm 11 may be disposed in a plane substantially at right angles to the axis of the motor. Connecting links 16, used in my modified mounting shown in Figure 3, may be the same as the connecting links 16 in my preferred motor mounting, as illustrated in Figures 1 and 2. These connection links 16 are fastened to the terminal portions 42 of arms 11. The outer or extending portion 43 of the arms 11 may be fastened at their outer extremities to a support or other apparatus, such, for example, as conduit or tubing support for the motor. In Figure 3, the rubber sleeves give a combined result substantially the same as the operation of the center resilient ring 12 about the end hub of the motor and the radially disposed rubber sleeves about the perimetrical edge 22 of the motor of Figures 1 and 2. With this modified motor mounting, the motor is fastened to the mounting on only one end of the motor. The end bell is resiliently fastened at annularly spaced intervals thereabout by the connecting links to the supporting apparatus. These connecting links provide a mounting support for the motor and the elastic or resilient means incorporated therein allows the motor to vibrate freely without transmitting the vibration through the mounting to the motor support apparatus. The motor vibration and noise are thereby suppressed by the resilient material which operates in shear, to isolate these vibrations.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mounting for an electric motor having an end bell with a hub portion thereon, said end bell having an annular portion encircling the hub portion, said mounting comprising a supporting spider having a center portion with an opening therein to receive said hub portion, said supporting spider having arms extending somewhat radially outwardly from the center portion and fastened thereto, means for resiliently mounting the said hub in the center portion of the supporting spider, and means for resiliently connecting the annular portion of said bell to the said arms at a distance radially from said hub.

2. A mounting for a motor having an end bell with a hub extending therefrom, said mounting comprising a supporting spider having a center portion with arms extending outwardly therefrom, said center portion having an opening through which the said hub extends, resilient means interconnecting said center portion and said hub, said end bell having an edge thereabout with extended means extending at spaced annular intervals therefrom for alignment with the arm of the said supporting spider, connecting links interconnecting said extended means and said arms, said connecting links having first resilient means about said arms and having second resilient means about said extended means of said end bell, said resilient means cooperating to reduce transmission of torsional vibration of said motor.

3. A mounting for a motor having an end bell with a hub extending therefrom, said mounting comprising a supporting spider having a spider center portion with arms extending outwardly therefrom at annularly spaced intervals, said spider center portion having an opening through which said hub extends, resilient means including a first band for engaging said hub and a second band for engaging said spider center portion with a resilient material therebetween, said end bell having members extending outwardly therefrom at annularly spaced intervals for alignment with said arms, first resilient sleeve means about each of said arms, second resilient sleeve means about each of said members, connecting links to clamp about said first resilient sleeve and about said second resilient sleeve for connecting said end bell to said arms at annularly spaced intervals, said connecting links and said spider center portion supporting said motor, said resilient means and said resilient sleeve means reducing the transmission of vibration caused by rotary movement of said motor.

4. In a mounting for mounting a motor onto a support element, said motor having on one end thereof an end bell with a center portion and an annular portion encircling said center portion, the provision of a resilient member interengaging said center portion and said support element, and at least a resilient link interconnecting said annular portion of said end bell and said support element at a distance radially from said resilient member.

5. In a mounting for mounting a motor onto a support element, said motor having an end bell with an annular edge portion, said support element having arms disposed at annular intervals about the annular edge portion and spaced therefrom, boss members extending at annular intervals from the annular edge portions for alignment with the arms, connecting links interconnecting the boss members and the said arms, each of said connecting links having a first resilient member extending about the respective arm and having a second resilient member extending about the respective boss member to reduce transmission of vibration and to support the motor.

6. A mounting for a motor having an end bell, said mounting comprising a supporting spider having a spider center portion with arms extending outwardly therefrom at annularly spaced intervals, said end bell having boss members extending outwardly therefrom at annularly spaced intervals for alignment with said arms, a first resilient sleeve about each of said arms, a second resilient sleeve about each of said boss members, clamps clampable about said first resilient sleeve and about said second resilient sleeve for connecting said end bell to each of said arms at said annularly spaced intervals, said resilient sleeves reducing the transmission of vibration supporting said motor.

7. In a mounting for mounting a motor onto a support element, said motor having on one end thereof an end bell with an annular edge portion, said support element having arms disposed at spaced annular intervals about the annular edge portion and spaced therefrom, boss members extending at spaced annular intervals from the annular edge portion for alignment with the arms, resilient connection links interengaging each of said boss members and its respective arm to reduce transmission of vibration and to support the motor on one end only, each said resilient connection link having substantially non-resilient spaced portions and a resilient member disposed between said spaced portions and resiliently carrying the load therebetween.

WAYNE J. MORRILL.

REFERENCES CITED

The following references are of record in the file of this patent:

UNITED STATES PATENTS

| Number | Name | Date |
| --- | --- | --- |
| 1,761,752 | Scott | June 3, 1930 |
| 2,070,782 | Canney | Feb. 16, 1937 |
| 2,099,566 | Lang | Nov. 16, 1937 |
| 2,178,401 | Meyerhoefer | Oct. 31, 1939 |
| 2,183,372 | Thoma | Dec. 12, 1939 |